US012785603B2

(12) United States Patent
Aoki

(10) Patent No.: US 12,785,603 B2
(45) Date of Patent: Nov. 3, 2026

(54) CONTROL DEVICE

(71) Applicant: DENSO CORPORATION, Kariya-city (JP)

(72) Inventor: Kohei Aoki, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 674 days.

(21) Appl. No.: 18/347,087

(22) Filed: Jul. 5, 2023

(65) Prior Publication Data

US 2024/0088815 A1 Mar. 14, 2024

(30) Foreign Application Priority Data

Sep. 9, 2022 (JP) ................................ 2022-143962

(51) Int. Cl.

*H02P 27/08* (2006.01)
*H02M 1/00* (2007.01)
*H02M 1/088* (2006.01)
*H02M 7/5395* (2006.01)

(52) U.S. Cl.

CPC .......... *H02P 27/08* (2013.01); *H02M 1/0009* (2021.05); *H02M 1/088* (2013.01); *H02M 7/5395* (2013.01)

(58) Field of Classification Search

CPC ........... H02M 7/53871; H02M 1/0009; H02M 1/088; H02M 7/5395; H02P 27/08; H02P 6/15; H02P 6/28
USPC ............................................ 318/504, 568.22
See application file for complete search history.

(56) References Cited

U.S. PATENT DOCUMENTS

2005/0125124 A1 6/2005 Nagase et al.
2005/0189891 A1* 9/2005 Kurosawa ................. H02P 6/28 318/400.35
2012/0163046 A1* 6/2012 Hibino .................... H02P 27/08 363/37
2015/0214882 A1* 7/2015 Suzuki ................ H02P 29/0241 318/400.27
2019/0068098 A1 2/2019 Iijima et al.
2021/0159829 A1* 5/2021 Jian ......................... H02P 21/10

FOREIGN PATENT DOCUMENTS

DE 102016118092 A1 * 6/2017
JP 2003-324985 A 11/2003
JP 5072561 B2 11/2012
JP 2019-080455 A 5/2019

* cited by examiner

*Primary Examiner* — Jorge L Carrasquillo
(74) *Attorney, Agent, or Firm* — Posz Law Group, PLC

(57) ABSTRACT

A control device includes an inverter circuit having a plurality of switching elements forming three upper and lower arms corresponding one-to-one to the phases of a three-phase motor. The control device includes a shunt resistor, a control circuit that outputs a PWM drive signal to the inverter circuit, and an amplifier circuit. During a regular control, a motor control section changes a pulse signal that controls switching of the switching element. The motor control section sets the switching element included in the arm located on a potential line side to which the shunt resistor is connected to a state in which current does not flow by changing the pulse signal. In this state, the current value acquisition section acquires the offset voltage converted by the shunt resistor.

2 Claims, 7 Drawing Sheets

CONTROL DEVICE

CROSS REFERENCE TO RELATED APPLICATION

The present application is based on Japanese Patent Application No. 2022-143962 filed on Sep. 9, 2022, disclosure of which is incorporated herein by reference.

TECHNICAL FIELD

The present disclosure relates to a control device for controlling a motor.

BACKGROUND

A current detection circuit sets a set voltage to be input to a differential amplifier to 0V by an input switch in order to detect an offset voltage of the differential amplifier.

SUMMARY

One of the disclosed control devices includes an inverter circuit including a plurality of switching elements constituting three upper and lower arms corresponding one-to-one to each phase of a three-phase motor, and configured to output a drive voltage to the motor by switching the switching elements based on a PWM drive signal, a shunt resistor provided between a ground-side potential line of the inverter circuit and a ground, or between a high potential line of the inverter circuit and a power supply section, a control circuit configured to output a PWM drive signal to the inverter circuit, and an amplifier circuit configured to amplify the voltage converted from the current by the shunt resistor and output the amplified voltage to the control circuit.

The control circuit includes a current value acquisition section configure to calculate a current value based on a signal input through the amplifier circuit, an offset correction section configured to cancel an offset voltage from the output voltage of the amplifier circuit, and a motor control section configured to control the switching element so as to satisfy a target number of revolutions and perform a regular control of the motor.

During the regular control, the motor control section sets the switching element included in the arm located on a potential line side to which the shunt resistor is connected to a state in which current does not flow by changing a pulse signal configured to control switching of the plurality of switching elements.

In this state, the current value acquisition section acquires the offset voltage converted by the shunt resistor.

DETAILED DESCRIPTION

Figure 1:
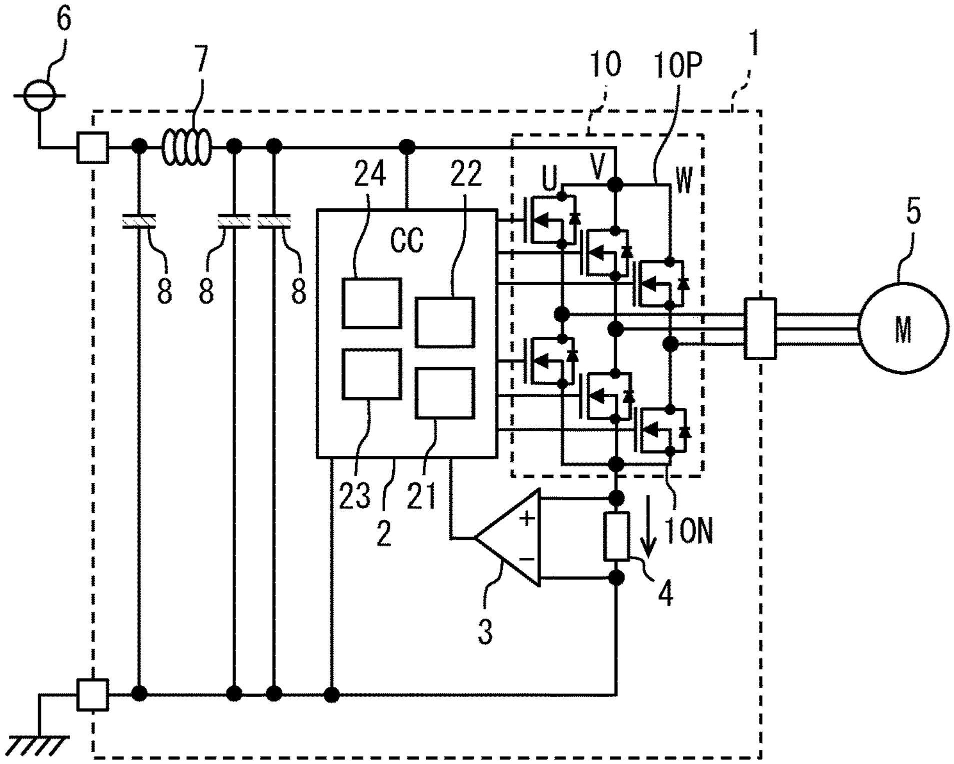
FIG. 1 is a diagram showing a configuration example including a control device.

According to the current detection circuit in an assumable example, the input switch, which is a dedicated component, is required in order to detect the offset voltage.

An object of the present disclosure is to provide a control device that does not require a dedicated component for the offset voltage detection and that can detect the offset voltage without stopping the motor.

One of the disclosed control devices includes an inverter circuit including a plurality of switching elements constituting three upper and lower arms corresponding one-to-one to each phase of a three-phase motor, and configured to output a drive voltage to the motor by switching the switching elements based on a PWM drive signal, a shunt resistor provided between a ground-side potential line of the inverter circuit and a ground, or between a high potential line of the inverter circuit and a power supply section, a control circuit configured to output a PWM drive signal to the inverter circuit, and an amplifier circuit configured to amplify the voltage converted from the current by the shunt resistor and output the amplified voltage to the control circuit.

The control circuit includes a current value acquisition section configure to calculate a current value based on a signal input through the amplifier circuit, an offset correction section configured to cancel an offset voltage from the output voltage of the amplifier circuit, and a motor control section configured to control the switching element so as to satisfy a target number of revolutions and perform a regular control of the motor.

During the regular control, the motor control section sets the switching element included in the arm located on a potential line side to which the shunt resistor is connected to a state in which current does not flow by changing a pulse signal configured to control switching of the plurality of switching elements.

In this state, the current value acquisition section acquires the offset voltage converted by the shunt resistor.

According to this control device, it is possible to temporarily provide a state in which current does not flow through the shunt resistor by means of the pulse signal changed during the regular control of the motor. By acquiring the offset voltage in this state, the offset voltage can be detected while the motor is rotating by inertia and the motor is not stopped. The offset correction section cancels the highly accurate offset voltage detected in this manner. The control device can realize highly accurate detection of the offset voltage and return to the regular control without stopping the motor. Therefore, the control device does not require a dedicated component for detecting the offset voltage and can detect the offset voltage without stopping the motor.

The following will describe embodiments for carrying out the present disclosure with reference to the drawings. In each of the embodiments, the same reference numerals are assigned to portions corresponding to the items described in the preceding embodiments, and a repetitive description of the corresponding portions may be omitted. In each embodiment, when only a part of the configuration is described, another embodiment previously described can be employed for other parts of the configuration. It may be possible not only to combine parts which are explicitly described in the embodiments to be able to be combined specifically, but also to partially combine the embodiments without such explicit description unless there is a problem with the combination.

First Embodiment

A first embodiment, which is an example of a control device capable of achieving the object disclosed in the specification, will be described with reference to FIGS. 1 to 7. This control device can be applied to an equipment that requires detection of a current value, and in the embodiment disclosed in this specification, it is applied to an apparatus that controls a driving of a motor. This control device can be used in an equipment that controls an electric fuel pump, an air conditioner fan, and the like. This control device can be used, for example, in vehicle equipment that requires detection of a current value.

In the present embodiment, as an example, an example in which the control device is applied to the electric fuel pump for a vehicle will be described. The electric fuel pump is used, for example, as a hydraulic supply source that supplies oil to an oil supply destination such as a hydraulic device such as a continuously variable transmission mounted on a vehicle. The electric fuel pump is connected to the vehicle ECU, pumps up the oil stored in an oil pan, applies hydraulic pressure, and supplies the oil to the oil supply destination.

The vehicle ECU is connected to various electronic components in the vehicle via a bus such as CAN (registered trademark). The vehicle ECU drives the electric fuel pump in order to supply oil to the oil supply destination when the engine is stopped due to, for example, an idling stop. When the engine is stopped, the vehicle ECU sends a drive command including a target rotational speed of the motor 5 to the electric fuel pump according to the temperature of the fuel. The electric fuel pump has a pump section, a motor 5 and a control device 1.

The pump section is connected to the motor 5 and the oil supply destination. The pump section is a pump driven by the motor 5. The pump section is driven by the motor 5 to force-feed the oil in the oil pan to the oil supply destination. The motor 5 includes a rotor having permanent magnets, and a stator in which coils 5Lu, 5Lv, and 5Lw corresponding to three phases U-phase, V-phase, and W-phase are wound in order in a rotation direction of the rotor. Each of the coils 5Lu, 5Lv, and 5Lw of each phase is connected to the control device 1.

The control device 1 is connected to the vehicle ECU and the motor 5. The control device 1 controls a driving of the motor 5 based on a drive command output from the vehicle ECU. For example, the control device 1 feedback-controls the motor 5 so as to reach a target value of a rotation speed command included in the drive command input from the vehicle ECU. The control device 1 performs weaker field control in order to increase a motor torque when the motor 5 rotates at high speed, and performs advance angle control to advance an energization timing of the motor 5 to an advance angle side.

The configuration of the control device 1 will be described with reference to FIGS. 1 and 2. As shown in FIG. 1, the control device 1 includes a power supply section 6, an inverter circuit 10, a control circuit 2, an amplifier circuit 3 and a shunt resistor 4. A power source to be converted by the inverter circuit 10 is a DC voltage supplied from a positive terminal of the power source section 6. An operating power source for the control circuit 2 is a DC voltage supplied from the positive terminal of the power supply section 6. An operating power source for the amplifier circuit 3 is a DC voltage supplied from the positive terminal of the power source section 6 to the power source terminal.

The power supply section 6 is a storage battery mounted on the vehicle. The power supply section 6 can be composed of a secondary battery such as a nickel-metal hydride battery or a lithium-ion battery. An electric double layer capacitor may be used for the power supply section 6 instead of the secondary battery.

The control device 1 includes a reactor 7 provided at a position to connect the power supply section 6 and a high potential line 10P, and a plurality of capacitors 8. One terminal of the reactor 7 is connected to the DC power supply 300 and one capacitor 8, and the other terminal thereof is connected to the two capacitors 8 and the high potential line 10P. The reactor 7 is configured to be able to store and release electrical energy. The capacitor 8 is, for example, a filter capacitor for removing power supply noise or a smoothing capacitor.

The inverter circuit 10 has a plurality of switching elements SW. The inverter circuit 10 converts the power supply current into a phase current by PWM (Pulse Width Modulation) control of turning ON and OFF of the switching element. As shown in FIG. 2, the inverter circuit 10 has six switching elements SW1 to SW6. The inverter circuit 10 includes a switching circuit having a plurality of switching elements SW. The inverter circuit 10 converts the power supply current into the phase current by switching ON and OFF of the switching elements SW1 to SW6.

The inverter circuit 10 has three upper and lower arms corresponding to the three phases on a one-to-one basis. The three upper and lower arms are arranged parallel to each other and connect the high potential line 10P and the ground-side potential line 10N. Each of upper and lower arms has two switching elements connected in series between the high potential line 10P and the ground-side potential line 10N.

The switching element SW1 and the switching element SW2 are connected in series between the high potential line 10P and the ground-side potential line 10N to form an arm switch corresponding to the U-phase. A connection point between the switching element SW1 and the switching element SW2 is connected to one end of the coil 5Lu. The switching element SW3 and the switching element SW4 are connected in series between the high potential line 10P and the ground-side potential line 10N to form an arm switch corresponding to the V-phase. A connection point between the switching element SW3 and the switching element SW4 is connected to one end of the coil 5Lv. The switching element SW5 and the switching element SW6 are connected in series between the high potential line 10P and the ground-side potential line 10N to form an arm switch corresponding to the W-phase. A connection point between the switching element SW5 and the switching element SW6 is connected to one end of the coil 5Lw.

In this embodiment, a case where the switching element SW is an FET (Field Effect Transistor) is described, but the present disclosure is not limited to this configuration. The switching element SW may be, for example, an IGBT (Insulated Gate Bipolar Transistor) and a BJT (Bipolar Junction Transistor). Each of the switching elements SW1 to SW6 is connected in parallel with each of the free wheel diodes D1 to D6. The gate terminals of the switching elements SW1 to SW6 are connected to the control circuit 2.

The shunt resistor 4 is provided between the ground-side potential line 10N of the inverter circuit 10 and the ground. The ground-side potential line 10N is connected to the circuit ground through the shunt resistor 4. In a variation, the shunt resistor 4 may be provided between the high potential line 10P of the inverter circuit 10 and the power supply section 6. The shunt resistor 4 constitutes one element of a current sensor for detecting the phase current.

A connection end between the ground-side potential line 10N of the inverter circuit 10 and the shunt resistor 4 is connected to an input terminal of the amplifier circuit 3. An output terminal of the amplifier circuit 3 is connected to a motor current monitoring port of the control circuit 2.

The control circuit 2 generates a PWM drive signal according to a rotational speed command input from the vehicle ECU via a signal terminal from the vehicle ECU or the like, and outputs the PWM drive signal to the inverter circuit 10. As a result, in the inverter circuit 10, the switching element SW is driven, a three-phase AC voltage is generated from the applied DC voltage, and supplied it to the motor 5.

A motor current value supplied to the motor 5 is converted into a voltage by the shunt resistor 4, amplified by a predetermined gain by the amplifier circuit 3, and input to the control circuit 2. When the control circuit 2 receives a detected voltage corresponding to a detected motor current value from the amplifier circuit 3, it performs the operation related to the present embodiment. The control circuit 2 generates a rotation pulse signal related to the motor 5 using the output voltage of the amplifier circuit 3, the DC voltage applied to the inverter circuit 10, the rotation speed command, and the like.

The output voltage of the amplifier circuit 3 also has an offset voltage. This offset voltage causes an error in the motor control. Due to this error factor, the detection accuracy of the motor current value may be hindered. When the high-precision current value detection is required, a high-precision operational amplifier is required, which may increase the cost of the device. In addition, the cost of the device also increases if there is a dedicated component that can detect the current value with high accuracy. For this reason, the control device 1 disclosed in the present disclosure provides a device capable of detecting the offset voltage while the motor 5 is in operation, without having a dedicated component for detecting the offset voltage.

The control circuit 2 functions as a device that detects the motor current value. The control circuit 2 includes an A/D converter 21, a current value acquisition section 22, an offset correction section 23, and a motor control section 24. The motor control section 24, the current value acquisition section 22, and the offset correction section 23 can be realized by, for example, CPU of a microcomputer executing a program in a storage device such as ROM.

The control circuit 2 includes at least one processor. For example, the control circuit 2 may be realized by a computer including a processor, a non-volatile memory, RAM, I/O, and a communication line connecting these components. The nonvolatile memory stores a program for operating a general-purpose computer as a control device of the motor. The processor executes the program stored in the non-volatile memory by using a temporary storage function of the RAM. By executing this processor, the control circuit 2 operates as the motor control section 24, the current value acquisition section 22, and the offset correction section 23. Execution of these operations corresponds to execution of a method implemented by the program.

The motor control section 24 controls the motor 5 by driving and controlling the inverter circuit 10 in response to a drive command from the vehicle ECU or the like. At this time, the motor control section 24 applies gate signals to the gate electrodes of each of the switching elements SW1 to SW6 of the inverter circuit 10 so as to satisfy the target rotation speed input as the rotation speed command. The motor control section 24 performs a regular control by controlling ON/OFF of the switching elements SW1 to SW6 so as to satisfy the PWM drive signal according to the command from the vehicle ECU or the like. The motor control section 24 performs the regular control by changing the duty of the PWM drive signal according to the rotation speed and varying the output rotation pulse signal.

The amplifier circuit 3 includes, for example, an operational amplifier, which is also called an operational amplifier. The operational amplifier has a non-inverting input terminal, an inverting input terminal and one output terminal. The non-inverting input terminal of the operational amplifier is electrically connected to the high potential side of the shunt resistor 4 and the inverting input terminal is electrically connected to the low potential side, which is the ground side of the shunt resistor 4. The output terminal of the operational amplifier is electrically connected to the A/D converter 21. The operational amplifier constitutes one element of a current sensor for detecting phase currents.

The operational amplifier amplifies the voltage difference occurring across the shunt resistor 4 and outputs it to the A/D converter 21. The A/D converter 21 converts the analog signal output from the operational amplifier into a digital signal and outputs the digital signal to the current value acquisition section 22. The current value acquisition section 22 calculates the phase current based on the output signal from the A/D converter 21 and generates phase current information.

The control circuit 2 receives the output voltage of the amplifier circuit 3 while the motor 5 is in an inertial state without stopping by controlling the switching element SW to a predetermined state. The current value acquisition section 22 sets the acquired voltage value as an offset voltage. After that, the offset correction section 23 performs a calculation to cancel the offset voltage from the output voltage of the amplifier circuit 3, and obtains a highly accurate motor current value. In this way, the control circuit 2 can absorb the error of the amplifier circuit 3 and detect the motor current value with high accuracy, so that the current information can be output with even higher accuracy.

With reference to FIGS. 2 to 7, the operation related to the current value detection of this embodiment performed by the control circuit 2 will be specifically described below. In this embodiment, as a representative example, a current value detection timing, an offset correction trigger, and the offset voltage acquisition timing when energizing the U-phase and V-phase will be described with reference to the drawings.

Figure 2:
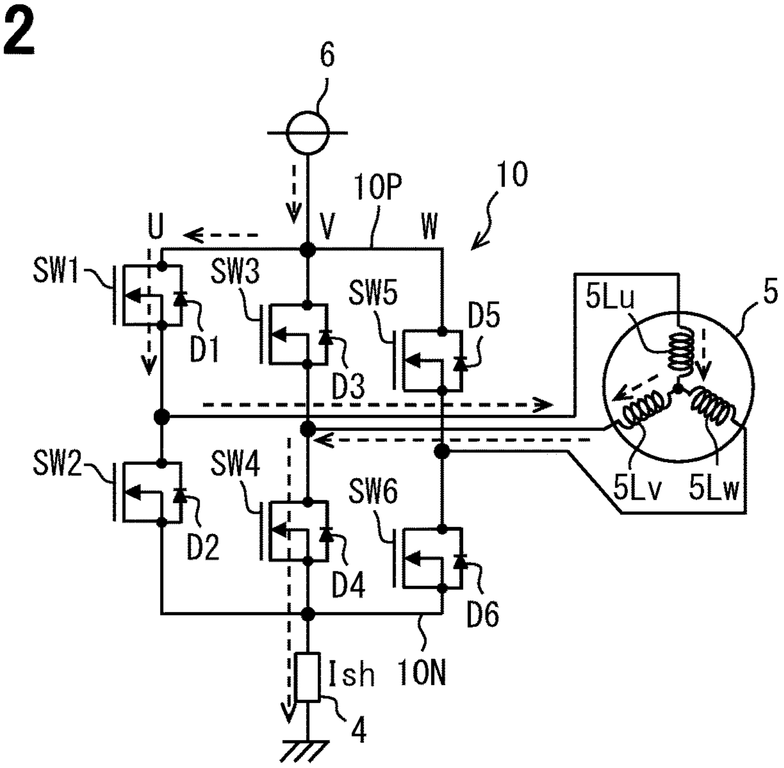
FIG. 2 is a diagram showing an example of switching when detecting a current value in U-phase-V-phase energization.
Figure 3:
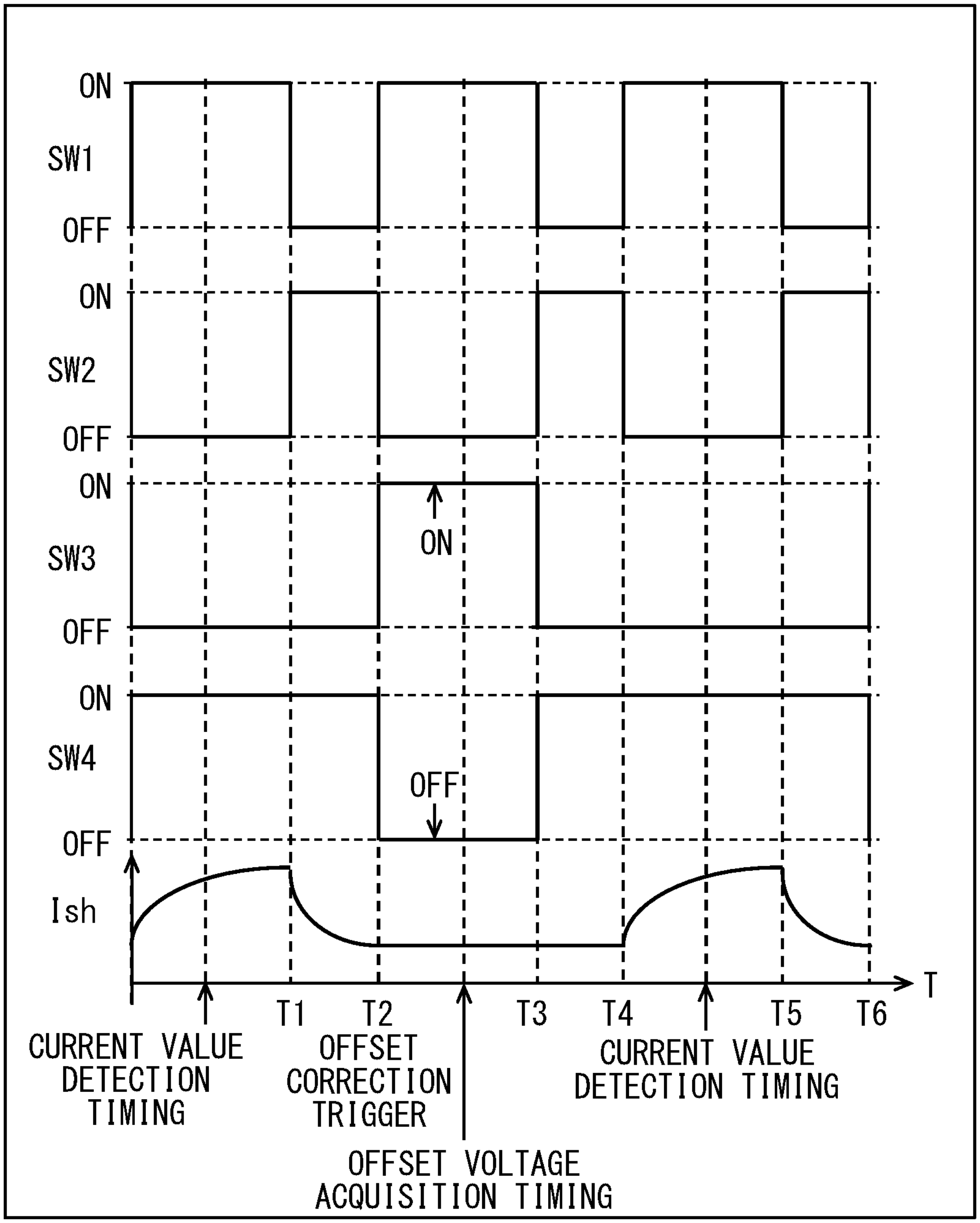
FIG. 3 is a timing chart showing switching during U-phase-V-phase energization.

FIG. 2 is a diagram showing an example of switching when detecting a current value in U-phase and V-phase energization. FIG. 3 is a timing chart showing switching of the switching elements SW1 to SW4 and changes in Ish when the U-phase and V-phase are energized. In FIG. 3, time T is plotted on a horizontal axis. Ish is a current value flowing through the shunt resistor 4.

The motor control section 24 controls the switching element SW of the inverter circuit 10 so as to form a PWM drive signal as shown in FIG. 3. The motor control section 24 forms the PWM drive signal that repeats a signal for one cycle up to time T2 in the regular control when energizing the U-phase and the V-phase. In one cycle of the regular control, the switching elements SW1 and SW4 are turned on and the switching elements SW2 and SW3 are turned off until time T1, and from time T1 to time T2, the switching element SW1 is turned off and the switching element SW2 is turned on. During the regular control, the switch control up to time T1 and the switch control from time T1 to time T2 are repeatedly performed. The switching elements SW5 and SW6 not shown in FIG. 3 are controlled to be turned off.

Figure 4:
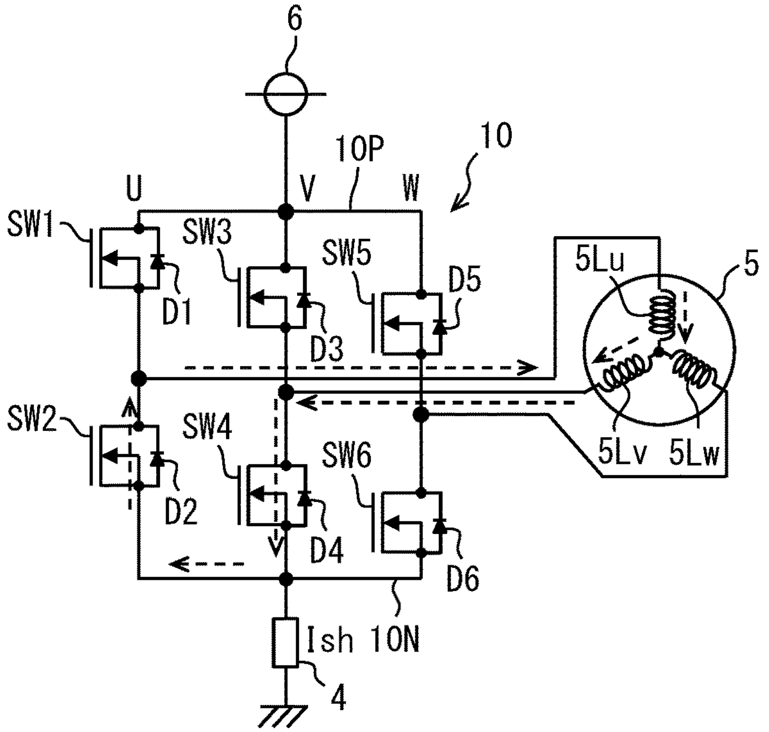
FIG. 4 is a diagram showing an example of switching in U-phase-V-phase energization.

In FIG. 2, current flow is indicated by dashed arrows. In the switch control up to time T1, as shown in FIG. 2, current flows from the power supply section 6 to the switching element SW1, the coil 5Lu, the coil 5Lv, the switching element SW4 in order, and then to the shunt resistor 4. At this time, Ish, which is the current value flowing through the shunt resistor 4, increases and peaks at time T1 as shown in FIG. 3. The current value detection timing in the regular control is the time until this time T1 is reached. The current flow in FIG. 4 is indicated by dashed arrows. In the switch control from time T1 to time T2, as shown in FIG. 4, the current circulates through the switching element SW2, the coil 5Lu, the coil 5Lv, and the switching element SW4. At this time, Ish, which is the current value flowing through the shunt resistor 4, decreases and becomes the lowest value at time T2, as shown in FIG. 3.

The regular control repeats PWM control for one cycle up to time T2, which has been described so far. The control circuit 2 performs a process of acquiring the offset voltage when a trigger for offset correction is established during the regular control. When a trigger for offset correction is established during the regular control, the following switch control is performed. FIG. 3 shows an example of switching to switch control for acquiring the offset voltage at time T2 when the trigger for offset correction is established. The control circuit 2 determines that the trigger for offset correction is established every time a predetermined time has elapsed. The control circuit 2 may determine that the trigger for offset correction is established at the timing when the power is turned on. The control circuit 2 may determine that the trigger for offset correction is established when the ambient temperature exceeds a threshold value. The control circuit 2 may determine that the trigger for offset correction is established when the number of revolutions of the motor 5 exceeds a reference value.

When the trigger for offset correction is established, the control circuit 2 performs control different from the regular control from time T2 to time T3 in order to perform a cancellation process of the offset voltage. From time T2 to time T3, control is performed to switch the switching element SW3 to ON and the switching element SW4 to OFF. Due to this switch control, from time T2 to time T3, as shown in FIG. 5, the current circulates through the switching element SW3, the switching element SW1, the coil 5Lu, and the coil 5Lv.

Figure 5:
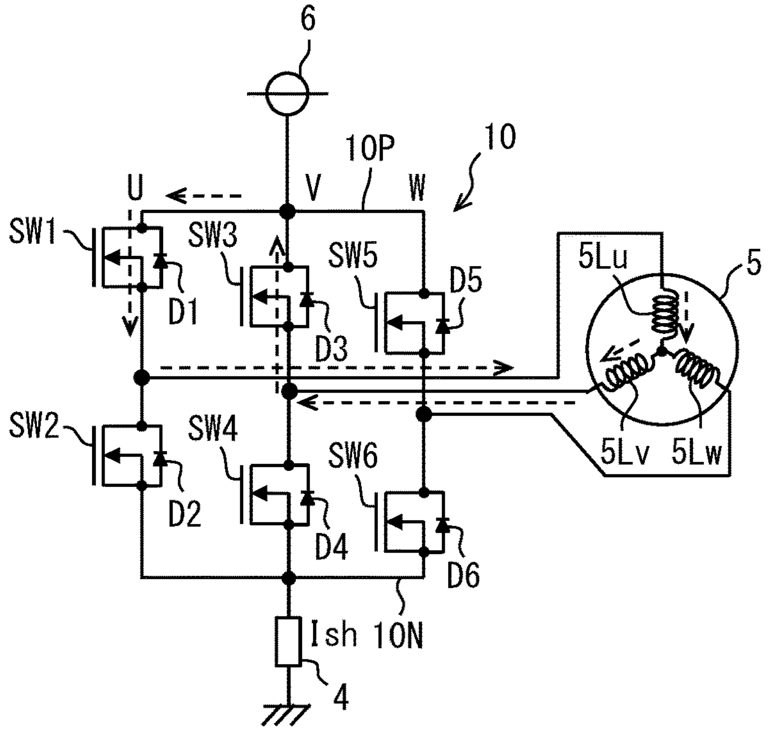
FIG. 5 is a diagram showing an example of switching when acquiring the offset voltage in U-phase-V-phase energization.

FIG. 5 shows an example of switching when the offset voltage is detected in U-phase and V-phase energization. The current flow in FIG. 5 is indicated by dashed arrows. As shown in FIG. 3, Ish, which is the value of the current through the shunt resistor 4, remains at the lowest value or zero from time T2 to time T3. The control circuit 2 detects the offset voltage between time T2 and time T3. The control circuit 2 turns on the switching element SW3 and turns off the switching element SW4 at time T2, thereby forming a current flow that does not pass through the shunt resistor and allowing the motor 5 to rotate by inertia. Therefore, the control circuit 2 can obtain the offset voltage when Ish is at the lowest value or zero without stopping the rotation of the motor 5.

Figure 6:
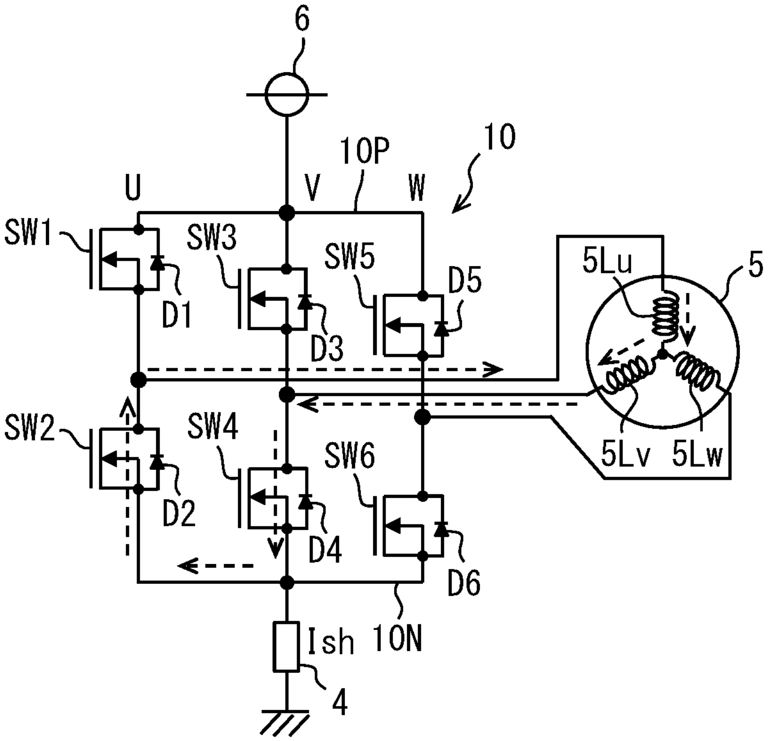
FIG. 6 is a diagram showing an example of switching after obtaining the offset voltage in U-phase-V-phase energization.

Next, from time T3 to time T4, the control circuit 2 performs switch control similar to time T1 to time T2, and returns the PWM drive signal to a pattern of regular control. The current flow in FIG. 6 is indicated by dashed arrows. In the switch control from time T3 to time T4, as shown in FIG. 6, the current circulates through the switching element SW2, the coil 5Lu, the coil 5Lv, and the switching element SW4 in the same manner as the current flow shown in FIG. 4. As shown in FIG. 3, Ish, which is the current value flowing through the shunt resistor 4, remains at the lowest value or zero continuously from time T3 until time T4.

From time T4 to time T6, the control circuit 2 performs the same switch control as the regular control up to time T2 as described above. In the switch control from time T4 to time T6, the current flow shown in FIG. 2 and the current flow shown in FIG. 4 are formed in order. At this time, Ish, which is the current value flowing through the shunt resistor 4, changes in the same way up to time T2, as shown in FIG. 3.

Figure 7:
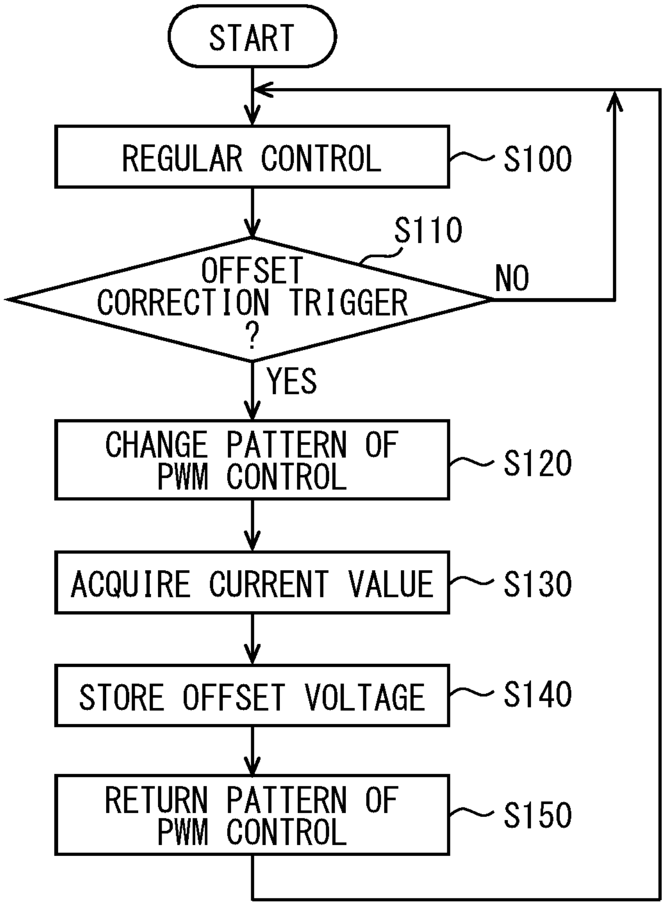
FIG. 7 is a flowchart showing a control process of a control device according to a first embodiment.

The current value detection timing, the offset correction trigger, and the offset voltage acquisition timing described above with reference to FIGS. 2 to 6 will be described based on the process shown in FIG. 7. FIG. 7 is a flowchart showing a control process related to offset voltage detection by the control device 1. The control process shown in FIG. 7 is started when the ignition switch or power switch of the vehicle is turned on. In step S100, the control circuit 2 executes the regular control described above. The control circuit 2 determines in step S110 during the regular control whether or not the above-described trigger for the offset correction has been established. When the trigger for the offset correction is not established in step S110, the process returns to step S100 to continue the regular control. When it is determined that the trigger for the offset correction is established, the control circuit 2 performs the detection process for the offset voltage in steps S120 to S140.

In step S120, a process of changing the pattern of the PWM control from the pattern of the regular control pattern is performed. The motor control section 24 controls the switching element SW in step S120 to perform a process of switching to the PWM drive signal as shown between time T2 and time T3 in FIG. 3. In this process, a step interval of pulse signal is formed in which no current flows through the shunt resistor 4, and the motor 5 continues to rotate by inertia. In this state, in step S130, the A/D converter 21 converts the analog signal output from the operational amplifier into a digital signal and outputs the digital signal to the current value acquisition section 22. Further, the current value acquisition section 22 calculates and acquires current information corresponding to the offset voltage based on the output signal.

In step S140, the control circuit 2 records and stores current information corresponding to the offset voltage in a storage device such as a RAM. Then, in step S150, the control circuit 2 executes a switching process for returning the PWM drive signal to the pattern of regular control as shown between time T3 and time T4 in FIG. 3. After the process of step S150, the process returns to step S100 to continue the regular control. The stored current information is used when the offset correction section 23 performs arithmetic process for canceling the offset voltage, and contributes to highly accurate calculation of the motor current value.

Operational advantages produced by the control device 1 according to the first embodiment are described. The control device 1 includes the inverter circuit 10 that outputs a drive voltage to the motor 5 by switching the switching element based on a PWM drive signal, and the shunt resistor 4. The inverter circuit 10 includes a plurality of switching elements that form three upper and lower arms that correspond to the phases of the three-phase motor 5 on a one-to-one basis. The shunt resistor 4 is provided between the ground-side potential line 10N of the inverter circuit 10 and the ground, or between the high potential line 10P and the power supply section 6. The control device 1 includes the control circuit 2 and the amplifier circuit 3 that amplifies a voltage converted from a current by the shunt resistor 4 and outputs the amplified voltage to the control circuit 2. The control circuit 2 includes the current value acquisition section 22 that calculates a current value based on the signal input via the amplifier circuit 3, the offset correction section 23, and the motor control section 24. The offset correction section 23 performs the process for canceling the offset voltage from the output voltage of the amplifier circuit 3.

During the regular control, the motor control section 24 changes the pulse signals that control switching of the switching elements. According to this change process, the switching element included in the arm located on the side of the potential line to which the shunt resistor 4 is connected is brought into a state in which current does not flow. In this state, the current value acquisition section 22 acquires the offset voltage converted by the shunt resistor 4.

According to this control device 1, it is possible to temporarily provide a state in which current does not flow through the shunt resistor 4 by means of the pulse signal changed during the regular control of the motor 5. By acquiring the offset voltage in this state, the offset voltage can be detected while the motor 5 is rotating by inertia and the motor is not stopped. The control device 1 can realize highly accurate detection of the offset voltage and return to the regular control without stopping the motor 5. The offset correction section 23 can perform processing for canceling the detected offset voltage with high accuracy. The control device 1 does not require a dedicated component for detecting the offset voltage and can detect the offset voltage without stopping the motor 5.

Control by the control device 1 is also useful in a motor control method such as balanced drive in which positive and negative Ish always flow. According to the control of the control device 1, the motor 5 is rotating by inertia while the current path is secured in the inverter circuit 10. Therefore, the inertial rotation time can be extended, which contributes to obtaining the offset voltage when Ish is zero.

Second Embodiment

A second embodiment will be described with reference to FIG. 8. The second embodiment differs from the first embodiment in the flow chart showing a control process related to the offset voltage detection. Configurations, actions, and effects not specifically described in the second embodiment are the same as those in the first embodiment, and points different from the first embodiment are described below.

Figure 8:
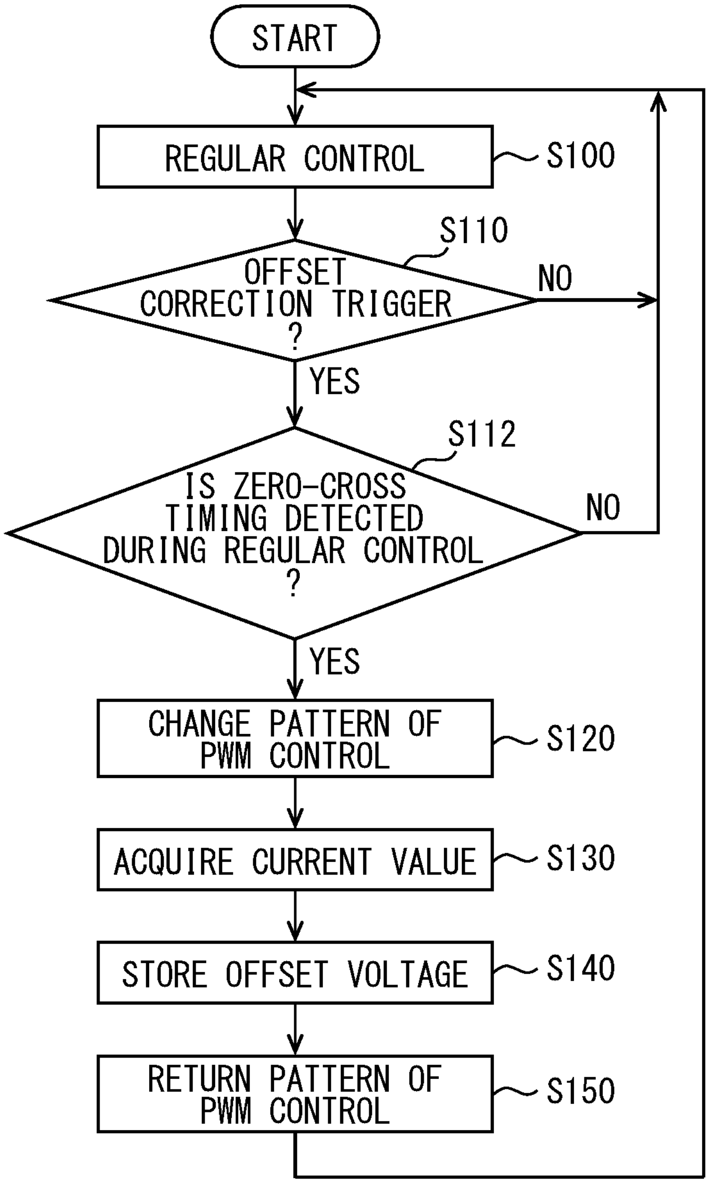
FIG. 8 is a flowchart showing a control process of a control device according to a second embodiment.

The control process shown in FIG. 8 differs from the control process of the first embodiment in that the determination process of step S112 is executed after YES is determined in step S110. In step S112, the control circuit 2 determines whether or not the timing at which the induced voltage from the motor 5 generated in the non-energized phase overlaps with the average of the energized phase voltages is detected in the three phases. This timing is also referred to herein as "zero-cross timing." This embodiment discloses a case where the U-phase and V-phase are energized and the W-phase is not energized. Therefore, the non-energized phase is the W-phase, and the average of the energized phase voltages is the average of the voltages of the U-phase and the V-phase. When the zero-cross timing is not detected in step S112, the process returns to step S100 to continue the regular control.

When the zero-cross timing is detected in step S112, the control circuit 2 performs the process for detecting the offset voltage in steps S120 to S140. If the PWM control pattern is changed in step S120 at the zero-cross timing, there is a concern that the average of the energized phase voltages will not be a proper value. In order to avoid this situation, it is desirable to perform the process for detecting the offset voltage while avoiding at the zero-cross timing. According to the control process of the second embodiment, it is possible to provide a desirable control in which the average of the energized phase voltages approaches half the battery voltage.

In the control process of the second embodiment, the process for detecting the offset voltage is performed when the offset correction condition is satisfied and the timing is other than the zero-cross timing. Further, in the control process of the second embodiment, it is preferable to perform the process for detecting the offset voltage immediately after the offset correction condition is satisfied and the zero-cross timing. That is, when the timing at which the induced voltage from the motor generated in the non-energized phase overlaps with the average of the energized phase voltage is detected during the regular control, the pulse signal is changed by shifting from this timing.

In this embodiment, as a representative example, the case where the U-phase and V-phase are energized and the W-phase is not energized is described, so the process in step S112 is merely an example and is not limited. In other words, the process in step S112 can be applied to the case where the U-phase and W-phases are energized and the V-phase is not energized, and the case where the V-phase and W-phases are energized and the U-phase is not energized.

Third Embodiment

A third embodiment will be described with reference to FIG. 9. The third embodiment differs from the second embodiment in the flow chart showing a control process related to the offset voltage detection. Configurations, actions, and effects not specifically described in the third embodiment are the same as those in the above-described embodiments, and points different from the first embodiment are described below.

Figure 9:
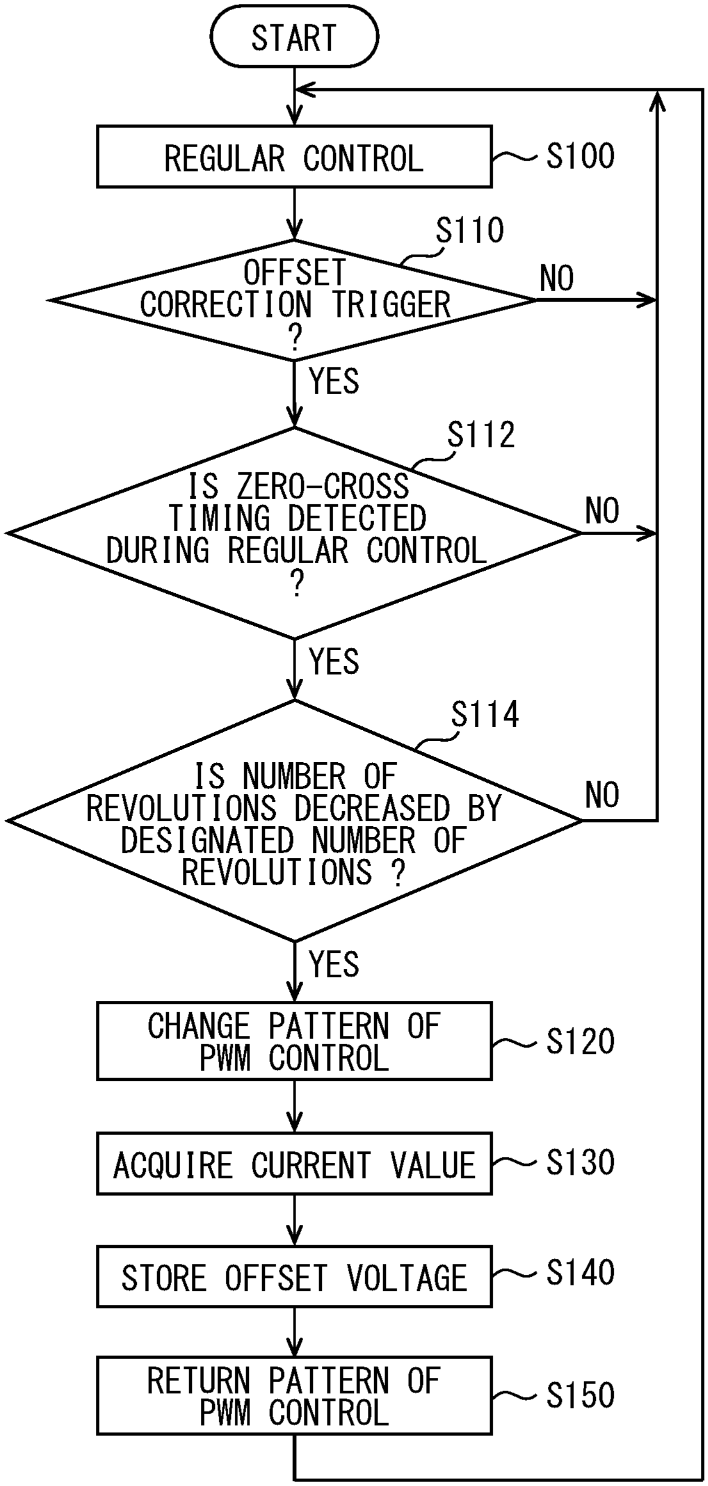
FIG. 9 is a flowchart showing a control process of a control device according to a third embodiment.

The control process shown in FIG. 9 differs from the control process of the second embodiment in that the determination process of step S114 is executed after YES is determined in step S112. In step S114, the control circuit 2 determines whether or not the number of revolutions of the motor 5 has decreased by a predetermined designated number of revolutions. When the number of revolutions of the motor 5 has not decreased by the designated number of revolutions in step S114, the process returns to step S100 to continue the regular control.

When it is detected in step S114 that the number of revolutions of the motor 5 has decreased by the designated number of revolutions, the control circuit 2 performs the process for detecting the offset voltage in steps S120 to S140. According to the control, it is possible to cut the current flowing through the shunt resistor 4 while reducing the load on the motor 5 during the inertial rotation of the motor 5. However, since the load on the motor 5 cannot be reduced to zero, the number of revolutions of the motor 5 decreases over time. According to the control process of the third embodiment, the process for detecting the offset voltage is executed at the timing when the rotation speed has decreased by the designated number of revolutions. Therefore, it is possible to avoid the demerit that the number of revolutions of the motor 5 decreases during the process for detecting the offset voltage.

The motor control section 24 changes the pulse signal when it detects that the trigger for the offset correction is established during the regular control and that the number of revolutions of the motor has decreased by a predetermined designated number of revolutions. When it is detected that the number of revolutions of the motor has decreased by a predetermined designated number of revolutions after detecting the zero-cross timing in S112 during the regular control, the motor control section 24 changes the pulse signal. In the control process of the third embodiment, the process for detecting the offset voltage is performed after the offset correction condition is satisfied and the number of revolutions of the motor 5 is decreased by the designated number of revolutions. In this control process, it is preferable to perform the process for detecting the offset voltage after the offset correction condition is established and after the zero-cross timing and after the number of revolutions of the motor is decreased by the designated number of revolutions.

Other Embodiments

The disclosure of the description is not restricted to the embodiments shown as examples. The disclosure encompasses the illustrated embodiments and variations thereof by those skilled in the art. For example, the disclosure is not limited to the combinations of components and elements shown in the embodiments, and various modifications and implementations can be performed. The disclosure may be implemented in various combinations. The disclosure may have additional portions that may be added to the embodiments. The disclosure encompasses the omission of parts and elements of the embodiments. The disclosure encompasses the replacement or combination of components, elements between one embodiment and another. The disclosed technical scope is not limited to the description of the embodiment. The disclosed technical scope is indicated by the description of the claims, and should be understood to include meanings equivalent to the description of the claims and all modifications within the scope.

In the above-described embodiments, the offset voltage acquisition timing and the like have been described by exemplifying the case where the U-phase and the V-phase are energized. The description of the offset voltage acquisition timing and the like with reference to FIGS. 2 to 7 can also be applied to the case of energizing other phases of the three phases. When energizing the U-phase and the W-phase, the switching elements SW1 and SW5 are controlled to be ON, and the switching elements SW2 and SW6 are controlled to be OFF when acquiring the offset voltage. When energizing the V-phase and the W-phase, the switching elements SW3 and SW5 are controlled to be ON, and the switching elements SW4 and SW6 are controlled to be OFF when acquiring the offset voltage.

In the embodiments of this specification, an example in which the control device 1 is applied to an electric fuel pump for a vehicle has been described, but the control device 1 is not limited to this application example.

The control device and the method therefor which have been described in the present disclosure may be also realized by a dedicated computer which constitutes a processor programmed to execute one or more functions concretized by computer programs. Alternatively, the device and the method described in the present disclosure may be implemented by a dedicated hardware logic circuit. Alternatively, the device and the method thereof described in the present disclosure may be implemented by one or more dedicated computers configured by a combination of a processor that executes a computer program and one or more hardware logic circuits. The computer programs may be stored, as instructions to be executed by a computer, in a tangible non-transitory computer-readable medium.

What is claimed is:

1. A control device, comprising:

an inverter circuit including a plurality of switching elements constituting three upper and lower arms corresponding one-to-one to each phase of a three-phase motor, and configured to output a drive voltage to the motor by switching the switching elements based on a PWM drive signal;

a shunt resistor provided between a ground-side potential line of the inverter circuit and a ground, or between a high potential line of the inverter circuit and a power supply section;

a control circuit, including a current value acquisition section, an offset correction section, and a motor control section, configured to output a PWM drive signal to the inverter circuit; and an amplifier circuit configured to amplify the voltage converted from current by the shunt resistor and output the amplified voltage to the control circuit;

wherein in the control circuit, the current value acquisition section is configured to calculate a current value based on a signal input through the amplifier circuit, the offset correction section is configured to cancel an offset voltage from the output voltage of the amplifier circuit, and the motor control section is configured to control the switching element so as to satisfy a target number of revolutions and perform a regular control of the motor, and during the regular control, the motor control section sets the switching element included in the arm located on a potential line side to which the shunt resistor is connected to a state in which current does not flow by changing a pulse signal configured to control switching of the plurality of switching elements, in this state, the current value acquisition section acquires the offset voltage converted by the shunt resistor, and during the regular control, when detecting a timing at which an induced voltage from the motor generated in a non-energized phase and an average of energized phase voltages overlap among the three phases of the motor, the motor control section shifts a timing from the timing and changes the pulse signal for controlling the switching of the switching element.

2. A control device, comprising:

an inverter circuit including a plurality of switching elements constituting three upper and lower arms corresponding one-to-one to each phase of a three-phase motor, and configured to output a drive voltage to the motor by switching the switching elements based on a PWM drive signal;

a shunt resistor provided between a ground-side potential line of the inverter circuit and a ground, or between a high potential line of the inverter circuit and a power supply section;

a control circuit, including a current value acquisition section, an offset correction section, and a motor control section, configured to output a PWM drive signal to the inverter circuit; and an amplifier circuit configured to amplify the voltage converted from current by the shunt resistor and output the amplified voltage to the control circuit;

wherein in the control circuit, the current value acquisition section is configured to calculate a current value based on a signal input through the amplifier circuit, the offset correction section is configured to cancel an offset voltage from the output voltage of the amplifier circuit, and the motor control section is configured to control the switching element so as to satisfy a target number of revolutions and perform a regular control of the motor, and during the regular control, the motor control section sets the switching element included in the arm located on a potential line side to which the shunt resistor is connected to a state in which current does not flow by changing a pulse signal configured to control switching of the plurality of switching elements, in this state, the current value acquisition section acquires the offset voltage converted by the shunt resistor, and during the regular control, after detecting a timing at which an induced voltage from the motor generated in a non-energized phase and an average of an energized phase voltages overlap among the three phases of the motor, and when it is detected that the number of revolutions of the motor has decreased by a predetermined number of revolutions, the motor control section changes the pulse signal for controlling switching of the switching element.

* * * * *